United States Patent [19]

De Meyer et al.

[11] Patent Number: 5,229,056

[45] Date of Patent: Jul. 20, 1993

[54] PRODUCING FABRIC REINFORCED HOSE

[76] Inventors: Willy De Meyer, A. Cartriestraat 191, 9810 Gent, Belgium; Marc P. Coehoorn, Bramlanden 79, 7542 CE Entschede, Netherlands

[21] Appl. No.: 775,394

[22] Filed: Oct. 16, 1991

Related U.S. Application Data

[62] Division of Ser. No. 589,101, Sep. 27, 1990.

[30] Foreign Application Priority Data

Sep. 28, 1989 [GB] United Kingdom ............... 8921938
Nov. 21, 1989 [NL] Netherlands .................... 8902868
Nov. 21, 1989 [NL] Netherlands .................... 8902869

[51] Int. Cl.⁵ .................. B29C 53/08; B29C 47/02
[52] U.S. Cl. ................................. 264/173; 264/174; 264/295; 264/339; 264/324; 425/114
[58] Field of Search ............... 264/173, 324, 174, 103, 264/149, 285, 295, 339; 425/114, 131.1, 133.1

[56] References Cited

U.S. PATENT DOCUMENTS

| 3,310,447 | 3/1967 | Matthews ............ 264/171 |
| 3,653,233 | 4/1972 | Titone . |
| 4,155,790 | 5/1979 | Galloway ........... 264/173 |
| 4,385,018 | 5/1983 | Kutnyak ............ 264/173 |
| 4,710,423 | 12/1987 | Imamura . |
| 4,738,735 | 4/1988 | Joncker et al. ....... 425/114 |
| 4,741,873 | 5/1988 | Fischer et al. ....... 264/324 |

FOREIGN PATENT DOCUMENTS

| 0194480 | 9/1986 | European Pat. Off. . |
| 1937945 | 1/1970 | Fed. Rep. of Germany ...... 264/174 |
| 50-30699 | 12/1975 | Japan ............... 264/173 |
| 7210117 | 1/1973 | Netherlands ........ 264/173 |
| 2090881A | 7/1982 | United Kingdom .... 264/103 |
| 2117418A | 10/1983 | United Kingdom . |

Primary Examiner—Jeffery Thurlow

[57] ABSTRACT

A method to produce a fabric reinforced hose product in which the reinforcing fabric therein has a stabilizing yarn therein extending in the longitudinal direction of the hose which is broken when the produced hose member has been flexed in the longitudinal direction.

1 Claim, 2 Drawing Sheets

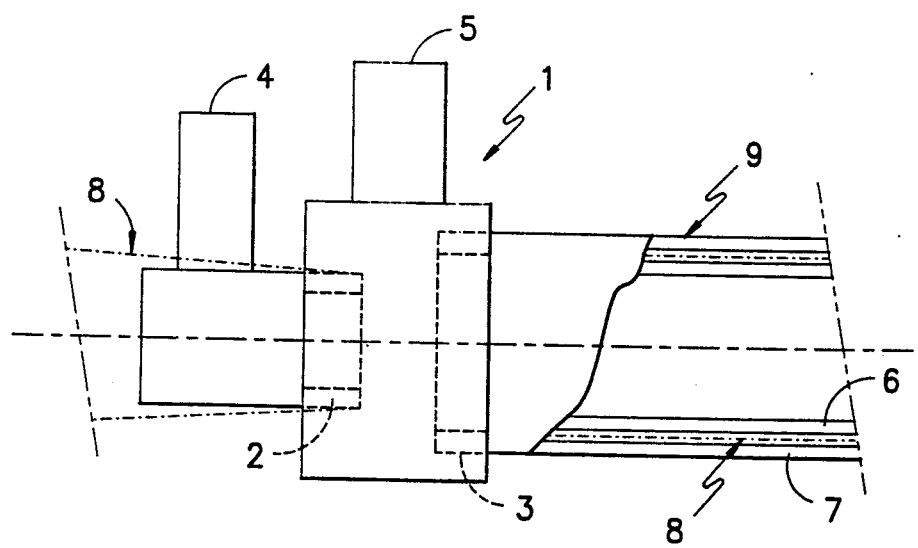
FIG. -1-
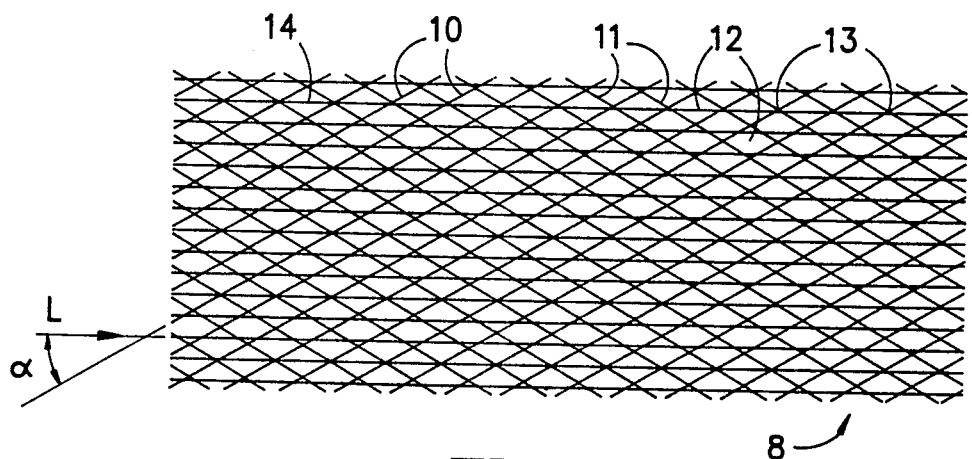
FIG. -2-
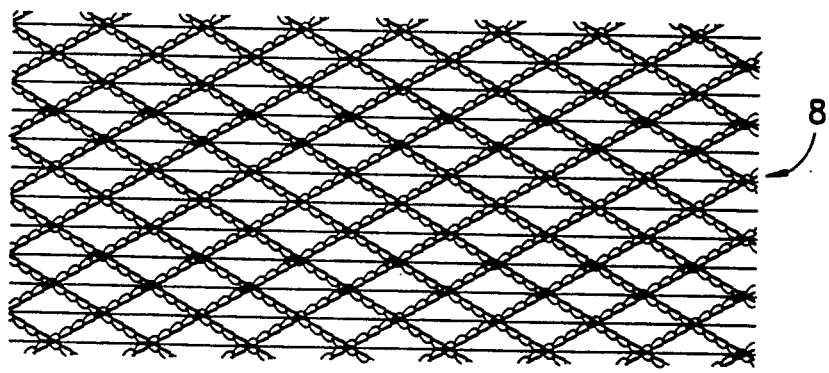
FIG. -3-

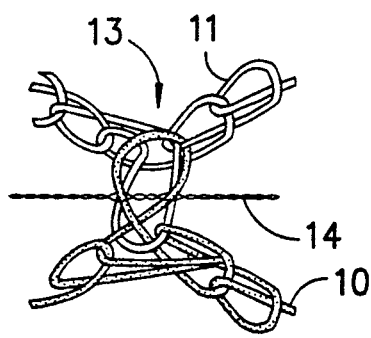
FIG. -4-
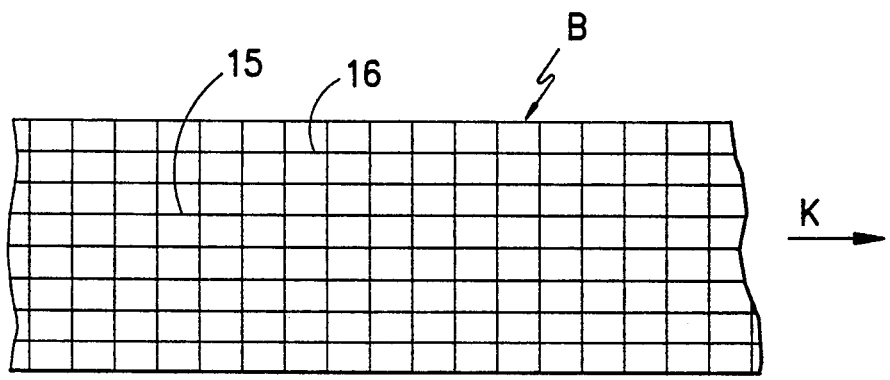
FIG. -5-
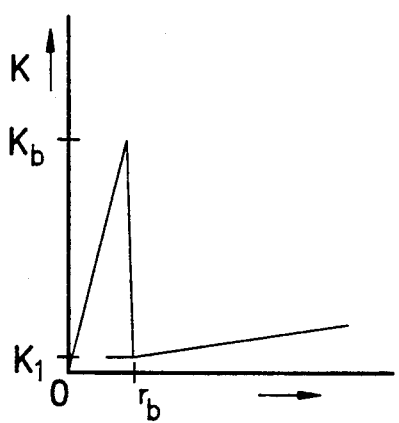
FIG. -6-
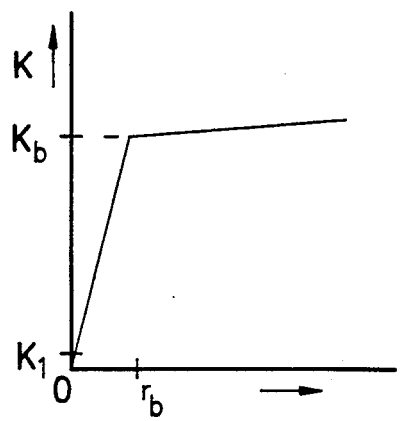
FIG. -7-

PRODUCING FABRIC REINFORCED HOSE

This is a division of application Ser. No. 589,101, filed Sep. 27, 1990 for STABILISED FABRICS AND REINFORCED PRODUCTS CONTAINING THEM.

FIELD OF THE INVENTION

This invention relates to textile fabrics of the type commonly used in industrial applications as a reinforcement of products including radiator hoses. The invention relates also to the reinforced products and to their manufacture.

BACKGROUND OF THE INVENTION

Reinforced hoses and other reinforced products, and also reinforcing fabrics, are often exposed to high temperatures during production and/or shaping, and in service. It is also usual for the fabric to be slit, heat-treated and/or to have a textile/matrix adhesive system applied.

A reinforcing fabric may be intimately bonded to a, say, curable rubber or plastics matrix. Under these conditions at least, the fabric should be dimensionally-stable, and should not distort or change its shape when tensioned.

Most woven fabrics used in industrial textile applications have a load-bearing warp and weft and will therefore not distort if tensioned in either direction. However, some textile fabrics are dimensionally less stable once they are released from the control mechanism of their production machines, and will easily distort when tensioned in the longitudinal or transverse direction. Such fabrics are sometimes preferred as reinforcing materials because they facilitate shaping during manufacture of the composite product, e.g. radiator hoses.

An automobile radiator coolant hose and a method for its production are disclosed in U.S. Pat. No. 4,242,296. It is apparently the case that the reinforcing fabric allows the hose material to be deformed to a limited extent only. The hose is produced by using a first extrusion head, for obtaining an inner hose portion onto which the reinforcing fabric is applied, and a second extrusion head for producing an outer hose portion on the fabric. When the second hose portion is applied, the fabric stretches. When the hose material is bent, the reinforcing fabric can be stretched only to a limited extent, so that the bending radius must be large.

EP-A-0100573 describes a method for shaping a hose of material including a reinforcing fabric, and curing the material in the desired shape However, it appears that, when the hose is bent, the fabric will not stretch as much as might be desired and will therefore tear, whereupon the wall of the hose may also tear/burst at the outside of the bend. If the reinforcing fabric does not tear, the inner side of the bend will fold: the internal cross-section of the tube is therefore distorted.

If a conventional reinforcing fabric can be stretched in the longitudinal direction sufficiently to allow bending of the hose, the likely result is that the fabric will stretch during production of a hose, resulting in a change in fabric orientation. The fabric's tensile strength or width may thus be changed undesirably, e.g. by reducing or removing the overlap between the edges of a fabric defining an annulus in a green hose, thus affecting the properties of the product when shaped. In other words, the fabric will not have the desired degree of dimensional stability.

It is an object of the present invention to avoid the disadvantages described above. A particular object behind the present invention is to provide a fabric which can withstand the forces applied to it when incorporated as a reinforcement in a composite product, and be stretched to a limited extent only during this procedure, but which should also allow the product to be bent into a desired shape, while retaining its reinforcing function.

SUMMARY OF THE INVENTION

A novel fabric according to the present invention is stabilised by means which are breakable or otherwise capable of losing their stabilising effect. A reinforced product, of the general type described above, comprising such a fabric, can thus be produced from a fabric which is dimensionally-stable, and the product is then treated or otherwise handled to destroy the stabilising means in situ, and give the advantage of easy shaping.

An important advantage of the present invention is that, on the one hand, distortion of the fabric during slitting and incorporation into a matrix is avoided, and, on the other hand, shaping of a product reinforced by the fabric is possible without deformation, e.g. buckling or tearing.

DESCRIPTION OF THE DRAWINGS

The invention will be described below by way of example only with reference to the accompanying drawings, in which:

FIG. 1 is a schematic side-view of apparatus for use in producing a composite product of the invention;

FIG. 2 is a schematic view of part of a fabric embodying the invention;

FIG. 3 is another view of a fabric embodying the invention;

FIG. 4 shows part of the fabric of FIG. 3 in detail;

FIG. 5 is a schematic view of another fabric embodying the invention;

FIG. 6 is a graph showing properties associated with a fabric of the invention; and FIG. 7 is another graph showing properties of a fabric of the invention.

DETAILED DESCRIPTION OF THE INVENTION

Suitable base fabrics, for use in the invention, may be of conventional mesh type. They may be non-woven, as obtained by laying filaments from two directions, e.g. having a Stabilon or Chavanoz-type construction. Preferred mesh fabrics are woven or, most preferably, knitted. They may also be produced with a biased warp and weft, by spirally slitting a tubular fabric woven on a circular loom, or woven double on a flat loom. Examples of suitable materials are aramids, cotton, rayon, polyester, polyamide, PVA, PVDF and any other known filamentary system. The mesh fabric is one which has a degree of stretchability in one or both dimensions.

In one embodiment of the invention, the base fabric is stabilised by the insertion, into the fabric construction, of a longitudinal carrier thread. The carrier thread may be a low strength filamentary material of sufficient strength to carry the fabric through slitting and the production of, say, a green hose, without distortion. When the stabilised fabric is incorporated into a composite product that requires shaping, e.g. a radiator coolant hose, the carrier thread is capable of breaking or passing its yield point, if appropriate on heating, thus enabling the shaping action to take place.

The carrier thread may consist of a thermoplastic material having an initial high modulus and high extension beyond its yield point. This material may or may not melt during subsequent processing, e.g. rubber cure. Thermoplasticity of the material can be utilised, in producing the stabilising fabric, to fix the mesh angle of the fabric at a desired value. A suitable thermoplastic material melts at at least 125° C., at least 150° C. or at least 165° C. Polypropylene, polyethylene or low-melting nylon is preferred.

The carrier thread may be bonded to the mesh fabric in any desired manner, e.g. adhesively and/or by stitching. Stitching may be particularly appropriate for an inlay mesh fabric.

In another embodiment of the invention, the base fabric has applied thereto a system that "locks" the fabric. Again, this may serve to provide a desired mesh angle. Examples of application methods are dot-coating, powder-coating and other applications of a binding composition. Such a composition is, for example, a latex, a resorcinol formaldehyde/latex composition, a PVC plastisol or any other adhesive system. The binding is adapted to be releasable under given conditions.

Binding or any other stabilising means may be released at a given temperature or under other conditions. For example, release may be chemically-activated, e.g. by including a material which gives an agent affecting the stabilising means under certain conditions. Such a material may be included in the fabric or in the matrix reinforced by the fabric.

A product of the invention may be made by generally known techniques, e.g. the separate extrusion of two layers of extrudable matrix material and the insertion therebetween of the reinforcing fabric. The product is preferably in the form of a tube or hose, but it will be apparent that the invention is equally applicable to the production of other products, such as cables, upholstery, boots or other footwear, roofing or tent reinforcement, and bicycle tires. In general, the invention is appropriate for use in cases where the product has to be bent through an arc or otherwise deformed into a desired shape. Shaping may be sufficient to provide a stable product: if necessary, curing or vulcanisation may follow.

By way of example, a hose of the invention may be produced by extruding material from first and second coaxial extrusion heads, and continuously supplying a strip of stabilised reinforcing fabric between the heads. The strip is applied so that its longitudinal edges are contiguous or overlapping, the strip being applied onto the inner layer of extruded material. The reinforcing fabric should preferably have a sufficiently open structure that the material or materials extruded through the coaxial heads can flow together through the fabric.

The stabilised reinforcing fabric has a modulus of elasticity which is relatively high, and thus a low degree of stretch, e.g. under tension up to a certain value. When the tension exceeds this value, the stabilising means may break or deconstruct, or the modulus of elasticity may be relatively low, and the fabric can therefore be relatively easily stretched. Initially, the fabric will maintain its shape when a force is applied in the longitudinal direction of the hose. When the hose is bent, the fabric is under strain at the outside of the bend, such that the stabilising means will be destroyed or deconstructed, or become yielding, so that the fabric can be stretched together with the material of the hose. Neither the base fabric nor the wall of the hose tears. The cross-section and stability of the hose are maintained.

The low elasticity exists for the fabric per se, and is retained over a range of conditions including slitting and bonding to a curable rubber or plastics matrix. This effect is reduced or removed under different conditions, e.g. under tension, but without affecting the integrity of the mesh. Therefore, after application of these different conditions, the fabric essentially comprises only, or substantially only, the mesh.

If the stabilising means is broken or otherwise deconstructed, or yields, under tension, the relative melting points of the mesh fabric and stabilising means are not critical. However, if the stabilising means is not breakable or yielding, the melting point of the stabilising means should be lower than that of the mesh fabric.

In particular, the reinforcing fabric can be in the shape of a knitted or woven fabric with an open structure and with meshes in the shape of a rhombus, parallelogram or other rectangle; opposing corner points of succeeding meshes lie on a line which, when the fabric is laid in the hose material, extends substantially parallel to the longitudinal direction of the hose, and are connected by longitudinal threads. These threads effect their connecting function as long as this is necessary, especially during slitting the fabric and a green hose production process.

The reinforcing fabric may comprise a woven fabric whose warp and weft threads are at a given distance from each other and are connected to each other at opposing corner points by means of connecting threads that extend at an oblique angle over the woven fabric. The connection itself can be achieved by, for example, welding or adhesively-binding the warp and weft threads and the connecting threads to each other. Welding is particularly suitable if the threads are of thermoplastic material. In this case, the warp threads will not coincide with the longitudinal direction of the hose to which the fabric is applied. This is less preferred, owing to the subsequent loss of material.

However, this disadvantage can be overcome by employing a woven fabric in which those threads running in the direction in which the fabric must be stretched, are formed by elastic threads and also a non-elastic thread for a given number of elastic threads; the non-elastic thread is adapted to lose its non-elasticity, or to break, when a given strain is exceeded.

A further alternative is that the reinforcing fabric is formed by a knitted fabric, in particular a knitted fabric produced by means of a Raschel machine. The meshes may thus be defined by double threads. In this case, the corner points of the meshes can simply be connected to stabilising threads, without welding or glueing.

Different fabric materials are of course suited to different types of construction. An aramid material is less suitable to be looped, and a base fabric of such a material may comprise a bonded mesh of linear filaments. If desired, stabilising carrier threads may be stitched in.

In general, it is preferred that the meshes are defined by sides making an angle of 40° to 80°, e.g. 40° to 70°, preferably 45° to 65°, e.g. about 54°, with the longitudinal direction of the fabric and of a hose or other product including the fabric.

FIG. 1 of the accompanying drawings shows an extrusion device 1 comprising coaxial extrusion heads 2 and 3 with respective connections 4 and 5 for the supply of material to be extruded. The extrusion heads 2 and 3 respectively provide an inner hose portion 6 and an outer hose portion 7. A reinforcing fabric 8 is supplied onto the hose portion 6 via a slit positioned between the extrusion heads 2,3.

In the interest of clarity, the hose portions 6 and 7 and the reinforcing fabric 8 are shown at some distance from each other. It will be readily appreciated that the hose portions 6 and 7 are in fact closely attached to each other, to form a hose 9.

FIG. 2 shows one example of a reinforcing fabric, e.g. the fabric 8, comprising threads 10 and 11 defining rhomboid meshes 12. The threads 10,11 each define an angle α with respect to both the longitudinal direction L of the reinforcing fabric and also the longitudinal direction of the hose 9. The angle α is, for example, 54°.

Longitudinally-opposing crossing-points 13 of the meshes 12 are connected by means of connecting threads 14. The threads 14 are of limited tensile strength, but can withstand the force which is exerted on the fabric 8 in the direction L during extrusion of the hose portions 6 and 7, during which the fabric is stretched only to a limited extent. On bending the uncured hose 9, the stretch to which the threads 14 is subjected, in particular in the outer portion of the bend, is sufficient to exceed the yielding or breaking point of the threads 14.

FIGS. 3 and 4 use, for the purposes of analogy only, the same reference numerals as in FIG. 2. They illustrate a reinforcing fabric of the invention, e.g. the reinforcing fabric 8, obtained by means of a Raschel machine. In this case, the threads 10,11 comprise knitted stitches and are double-threaded. The connecting threads 14 may also be double-threaded, and may be knitted with the threads 10,11 at the points 13, to provide the reinforcing fabric with good dimensional stability. Alternatively, the connecting threads 14 may be welded or glued to the other threads at the points 13.

FIG. 5 shows a woven fabric, e.g. the fabric 8, comprising elastic warp threads 15 and also warp threads 16 having a substantially higher stiffness. The threads 16 break or yield when a given force is exerted in the direction of the arrow K.

FIG. 6 shows the elasticity of a reinforcing fabric, with respect to an increasing applied force K. At a given force $K_b$ and a degree of stretch $r_b$, stabilising threads (14 or 16) yield or break. Thereafter, only a small force $K_1$ has to be exerted on the fabric to maintain the stretch $r_b$, and the stretch can increase considerably as K is increased only to a small extent. Under these conditions, the modulus of elasticity of the fabric is small, so that the fabric can be stretched easily and brought into the desired shape, without losing the fabric's ability to reinforce the product.

FIG. 7 corresponds in part to FIG. 6. Under the applied force $K_b$ and at the stretch $r_b$, stabilising threads (14 or 16) yield, and the stretchability of the reinforcing fabric increases considerably, for only a small increase in applied force.

The following Examples illustrate the invention.

EXAMPLE 1

A dimensionally-unstable (in the sense that it can be stretched in the warp and weft directions) fabric, of the type having a diamond knit construction, and commonly used as a reinforcement for automotive coolant hose, is based on b 420 dtex aramid (Twaron) and an Atlas stitch of 3.35 whales/cm and 9.9 columns/cm. The total greige weight is about 80 g/m$^2$.

This fabric is stabilised by the introduction of a 78 dtex polypropylene yarn as carrier thread, to give a fabric as illustrated in FIGS. 3 and 4. After knitting, this fabric is passed through a dipping unit where an adhesive coating of an RFL is applied and dried at a temperature just under the melting point, so that the carrier yarn shrinks to form a high modulus carrier. It is also possible to heat-set the fabric, without applying any coating.

The stabilised fabric is used for the reinforcement of a coolant hose by means of apparatus as illustrated in FIG. 1. The carrier thread ensures that the diamond pattern of the reinforcement is not distorted during slitting and extrusion. During the shaping of the coolant hose, the carrier thread extends beyond its yield or break. If the temperature during shaping is above 165° C., the polypropylene carrier thread will meld.

EXAMPLE 2

A dimensionally-unstable fabric of the same type of construction and also commonly used as a reinforcement for automotive coolant hose is based on 1220 dtex rayon and has an Atlas stitch of 4.72 whales/cm and 5.51 columns/cm. The total greige weight is about 163 g/m$^2$.

The mesh fabric is stabilised by the introduction of a 78 dtex polypropylene yarn. After knitting, this fabric is taken through a stenter. RFL adhesive treatment of the fabric at this stage is optional. By the influence of the heat, the carrier yarn is shrunk to form a high modulus carrier yarn. At the same time the fabric is brought under the desired reinforcement angle (40° to 70°) according to the application needs. The carrier yarn ensures that the fabric does not lose its shape during the following processes, e.g. slitting and extrusion. During shaping, a higher load will be applied which will extend the carrier yarn or break it.

We claim:

1. A method to produce a shaped hose member comprising the steps of: providing coaxial inner and outer extrusion heads, reinforcing fabric having at least one carrier yarn extending in the axial direction of the extrusion head which has a breaking strength less than the other yarns in the fabric, extruding extrudable material through said inner and outer extrusion heads around the reinforcing fabric and bending the formed hose into desired shape to break the carrier yarn.

* * * * *

UNITED STATES PATENT AND TRADEMARK OFFICE
CERTIFICATE OF CORRECTION

PATENT NO.   :   5,229,056
DATED        :   July 20, 1993
INVENTOR(S)  :   Willy De Meyer, Marc P. Coehoorn It is certified that error appears in the above-identified patent and that said Letters Patent is hereby corrected as shown below:

Column 6, line 53, after "heads," insert --placing between said extrusion heads a--

Signed and Sealed this

Twelfth Day of April, 1994

Attest:

BRUCE LEHMAN

*Attesting Officer*              *Commissioner of Patents and Trademarks*